June 12, 1962  L. FIALOVSZKY  3,038,368
CO-ORDINATE THEODOLITE

Filed Sept. 8, 1959  3 Sheets—Sheet 1

INVENTOR
LAJOS FIALOVSZKY
BY  Irwin S. Thompson
ATTORNEY

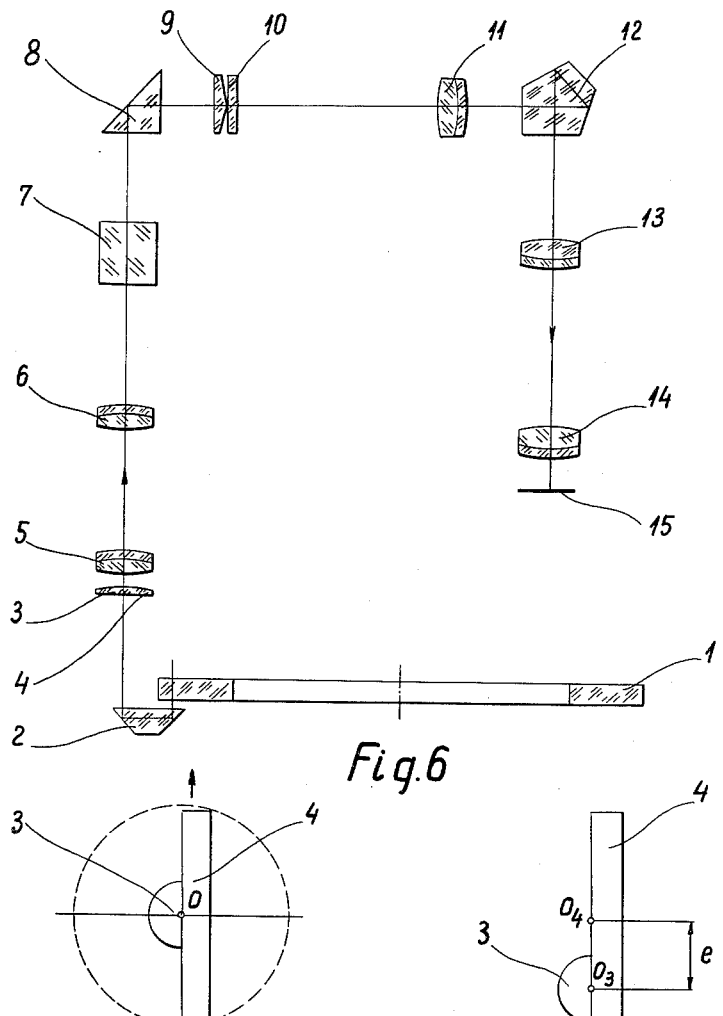

June 12, 1962  L. FIALOVSZKY  3,038,368
CO-ORDINATE THEODOLITE
Filed Sept. 8, 1959  3 Sheets-Sheet 3

INVENTOR
LAJOS FIALOVSZKY
BY  Irwin S. Thompson
ATTORNEY

United States Patent Office 3,038,368
Patented June 12, 1962

3,038,368
CO-ORDINATE THEODOLITE
Lajos Fialovszky, Budapest, Hungary, assignor to
Gamma Optikai Muvek, Budapest, Hungary
Filed Sept. 8, 1959, Ser. No. 838,614
Claims priority, application Hungary Sept. 10, 1958
6 Claims. (Cl. 88—1)

In surveying, a customary method of measurement is polygonisation or traversing. The development of polygonisation is directed towards the measurement of the distance between polygon points, that is to say the polygon sides, by means of a theodolite equipped for optical range finding, instead of by means of direct distance measurement. It is desirable that the instrument should give directly the distances reduced to the horizontal plane. This is achieved by the use of what is called a reduction tachymeter constructed on the basis of various function principles. The final object in surveying, however, is the determination of the co-ordinates of points on the ground in some geodetic co-ordinate system, for example a north-east system. For this purpose, calculations performed in the office are necessary, even if the reduced distances are available. The requirement now arises for a geodetic instrument which will give directly, as measured result, the co-ordinate differences $\delta y_i = y_i - y_{i-1}$ or $\delta x_i = x_i - x_{i-1}$ of any desired polygon point $P_i$, referred to the co-ordinates $y_{i-1}$, $x_{i-1}$ of the polygon point $P_{i-1}$. By means of such an instrument, the co-ordinates $y_n$, $x_n$ of the point $P_n$ (end point) can be determined on the spot from the measured co-ordinate differences $\delta y_i$ and $\delta x_i$, $$y_n = y_0 + \sum_{i=1}^{n} \delta y_i \qquad (1)$$

$$x_n = x_0 + \sum_{i=1}^{n} \delta x_i \qquad (2)$$

where $y_0$ and $x_0$ are the known co-ordinates of the initial point of the polygon traverse.

A number of fundamental principles have already been published in the technical literature for solving the problem of the co-ordinate theodolite, but it has not been possible to put the proposals made heretofore into practical effect, due to their extremely complicated nature.

The present invention permits the practical realisation of the co-ordinate theodolite on the basis of its hereinafter described fundamental optical and mechanical solution.

Figure 1:
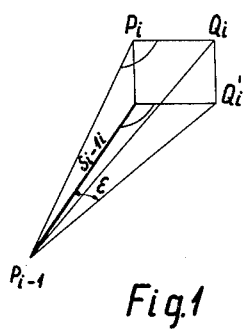
Figure 3:
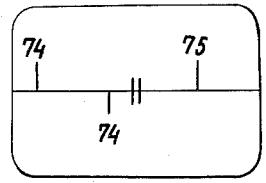
Figure 4:
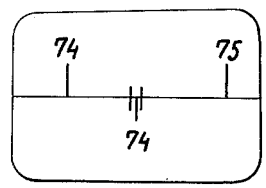
Figure 2:
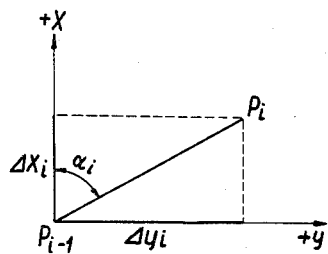
Figure 5:
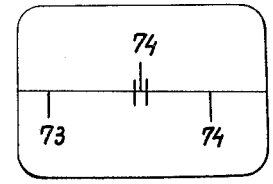
Figure 9:
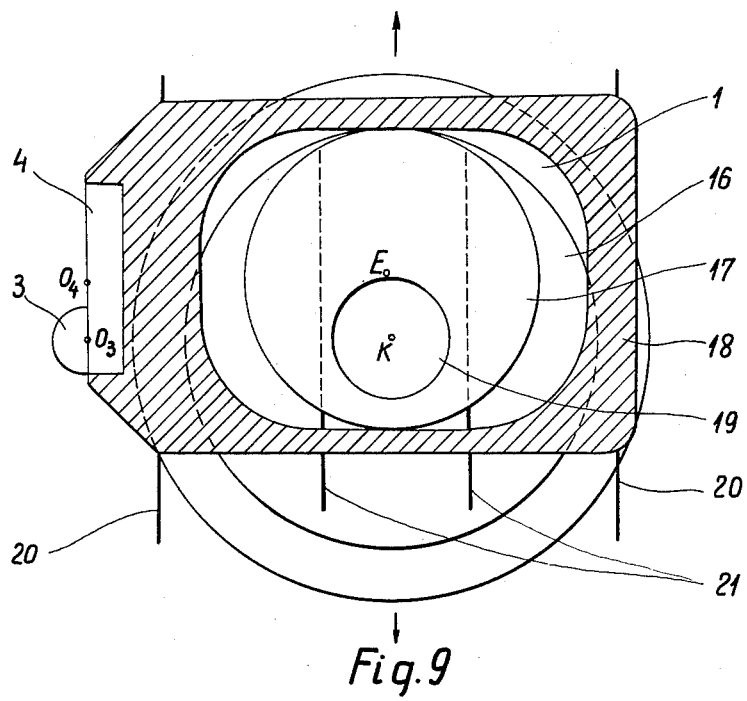
Figure 10:
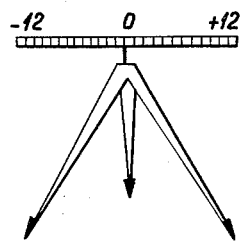
Figure 11:
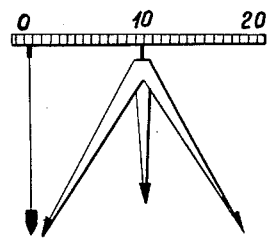

The working principle and an example of a constructional form of the invention are illustrated in the accompanying drawings, in which:

FIG. 1 is a diagram representing the known tachymetric method by telescope rotation through $\epsilon$, using a horizontal tachymetric staff, FIG. 2 shows the projections of the reduced distance referred to the co-ordinate axes $y$, $x$, FIG. 3 shows diagrammatically the entire horizontal reading image visible in the reading microscope of the co-ordinate theodolite, FIG. 4 shows the position of the entire horizontal reading image shifted by means of the optical micrometer, FIG. 5 shows the entire horizontal reading image shifted by the horizontal adjusting screw, FIG. 6 is a diagram of the horizontal reading device (section in the vertical plane of the horizontal axis of the theodolite), FIG. 7 shows the half-lens for deflecting the half-beam, in plan, FIG. 8 shows the half-lens for deflecting the half-beam in the shifted position, FIG. 9 shows diagrammatically in plan the mechanical solution of the arrangement for controlling the deflecting half-lens, FIG. 10 is a diagram of the co-ordinate measuring staff with two scales, FIG. 11 is a diagram of the co-ordinate measuring staff with a single scale.

It is known that the horizontal projection $S_{i-1,\,i}$ of the slant range of the polygon points $P_{i-1}$ and $p_i$, that is to say, the reduced distance between the said points, can be determined by means of a theodolite set up over the point $P_{i-1}$ using a horizontal staff set up over the point $P_i$ at right angles to the straight line $P_{i-1}P_i$. First, the 0-mark on the staff is sighted by rotation of the repetition axis. The telescope is then rotated through a small angle $\epsilon$ by means of th horizontal adjusting screw, and then the staff interval $l_i = P_i Q_i = P_i' Q_i'$, determined on the staff by means of the vertical wire of the telescope, is to be read off in cm.

The reduced distance $S_{i-1,\,i}$ is then obtained as $$S_{i-1,\,i} = l_i \cot \epsilon$$

This may also be written as follows:

$$S_{i-1,\,i} = \frac{\cot \epsilon}{100} \cdot l_i \cdot 100 \qquad (3)$$

and by means of the notation $$L_i = \frac{\cot \epsilon}{100} \cdot l_i \text{ cm.}$$

we get $$S_{i-1,\,1 \text{ (cm)}} = 100 L_i$$

or $$S_{i-1,\,1 \text{ (cm)}} = L_i \qquad (4)$$

if the scale interval $$I = \frac{100}{\cot \epsilon}$$

instead of the usual 1 cm. is used on the staff. According to Formula 4, the number of scale intervals read off on the staff gives directly the reduced distance.

For solving the problem considered, however, we require the projections $$\delta y_i = S_{i-1,\,1} \cos \alpha_i \qquad (5)$$

and $$\delta x_i = S_{i-1,\,1} \cos \alpha_i \qquad (6)$$

of the horizontal distance $S_{i-1,\,1}$ referred to the co-ordinate axes $y$ and $x$ (FIG. 2).

Expression 4 substituted in Formulae 5 and 6 gives:

$$\delta y_i = L_i \cos \alpha_i \qquad (7)$$

$$\delta x_i = L_i \cos \alpha_i \qquad (8)$$

If provision is now made for the two sightings to give the staff readings $$L_{iy} = L_i \sin \alpha_i \qquad (9)$$

$$L_{ix} = L_i \cos \alpha_i \qquad (10)$$

instead of the reading $L_i$, the co-ordinate differences $\delta y_i$ and $\delta x_i$ are given directly by the staff readings.

The staff readings determined by the Formulae 9 and 10 can be obtained if, before making the second sighting, the telescope is rotated by the angle $$\epsilon^\circ . \sin \alpha_i \qquad (11)$$

and $$\epsilon^\circ . \cos \alpha_i \qquad (12)$$

instead of $\epsilon^\circ$. It is assumed that the horizontal reading image appearing in the reading microscope of the co-ordinate theodolite directed on to the point $P_i$ is divided as shown in FIG. 3 into two equal parts. One part, for example, the upper half-part, is the actual image of the reading place on the horizontal circle, while in the other (lower) half-image, on the contrary, this reading place appears displaced at right-angles to the graduation lines. Assume, now, that the displacement $A_{1y}$ of the lower half-image relatively to the upper half-image is $A_{1y}=b.\sin \alpha_1$, where $b$ is the dimension of the angle $\epsilon$ on the horizontal circle measured on the line of separation of the two half-images. If, now, in some way, the entire horizontal reading image, that is to say, the upper and lower parts together, is displaced with constant line of sight until in the lower image-part, for example, the scale line 74, is situated symmetrically centrally between the two fixed index lines situated in the middle of the field of view of the reading telescope (FIG. 4), then in view of the fact that the upper part of the reading image has been displaced to the same extent, the scale line 74 of the upper image-part will be at the distance $b.\sin \alpha_1$ from the index centre. The theodolite telescope should now be rotated by means of the horizontal adjusting screw until the graduation line of the upper image-part comes between the two index lines (FIG. 5). The sighting line will thereby have been rotated through the necessary angle $\epsilon \sin \alpha_1$. In this position, the value determined by Formula 9 can be read off in the telescope on the tachymeter staff, thereby giving directly the desired co-ordinate difference $\delta y_1$.

It is assumed that after the sighting made at point $P_1$, the displacement of the lower image-part in the reading microscope relatively to the upper image-part is $$A_{1x}=b \cos \alpha_1 = b \sin (90°+\alpha_1)$$

If now the entire horizontal reading image is shifted in some way, without rotation of the alidade, until for example the graduation line 74 comes centrally between the two index lines, and the telescope is then rotated by means of the fine-adjustment screw into the position in which the graduation line of the upper image-part comes centrally between the two index lines, the sighting line will come into a position rotated through the angle $\epsilon \cos \alpha_1$. The sighting line will now cut off the interval on the staff, corresponding to Formula 10, giving directly the desired co-ordinate difference $\delta x_1$.

Therefore, a fundamental constructional solution is to be found, according to which:

(a) The microscope image of the horizontal reading place can be separated into two part-images;

(b) The lower image-part is displayed automatically in proportion to the sine or cosine of the particular horizontal angle reading;

(c) Maximum displacement $A_1$ in the case of $\alpha=90°$ for $\delta y_1$ measurement and in the case of $\alpha=0$ for $\delta x_1$ measurement is equal to the distance $b$;

(d) The entire horizontal reading image, that is to say, the upper and lower image-parts together, can be displaced to an extent such that any graduation line of both lower and upper image parts, can be adjusted to come centrally between the two index lines.

A simple constructional solution has been found for this problem of the co-ordinate theodolite.

In FIG. 6, the horizontal circle 1 is graduated in degrees but both (outer and inner) ends of the graduation lines are numbered. The path of rays of the horizontal reading includes the positive semi-circular half-lens 3 of long focus and the oblong half-lens 4 of the same focal length. The two half-lenses 3 and 4 are worked together as a single lens so as to ensure the same focal lengths. The half-lens 3 is incorporated fast in the theodolite alidale, but the half-lens 4 can be displaced at right-angles to the plane of the drawing, that is to say in the horizontal direction. If the half-lens 4 is in the basic position (FIG. 7), the optical centres of the two half-lenses coincide at the point "O," and the two half-lenses act as a single whole lens. If the half-lens 4 is displaced forward or backward in the direction of the arrow (FIG. 7) into the position shown in FIG. 8, the half-beam passing through this half-lens will deviate in the plane determined by the optical axis and the direction of displacement, the deviation being greater, the greater is the lens displacement $e$ and the smaller is the focal length of the lens.

Displacement of the half-lens 4 is controlled by rotation of the alidade. In the constructional form according to FIG. 9, the diameter of the eccentric 17 fixed to the metal holder 16 of the horizontal circle is equal to the width of the aperture in the frame slide 18. The centre hole 19 is for the insertion of the cylindrical alidade spindle into the bush of the instrument lower part. The slide 18 is movable in the direction of the arrow on the two guide rails 20, fixed to the alidade. If the alidade is rotated about the vertical axis relatively to the horizontal circle, the frame slide will be displaced in the direction of the arrow by the eccentric 17. The degree of displacement is proportional to the sine of the angle of rotation between the direction of the rails 20 and the direction at right-angles to the eccentricity of the disc 17, or if the horizontal circle has previously been rotated through 90°, to the cosine of the angle of further rotation. The half-lens 4, built into the slide, is also moved together with the frame slide 18. If the horizontal circle 1 is fixed on the holder 16, so that a lateral angle $\alpha=0$ can be read off in the case in which the half-lens 4 is in the basic position, the displacement of the half-lens 4 on sighting to any lateral angle $\alpha_1$ is also proportional to $\sin \alpha_1$ or $\cos \alpha_1$.

The common focal length of the half-lenses 3 and 4 should be so dimensioned that exactly the desired maximum beam deflection occurs with maximum displacement of the half-lens 4.

The plane-parallel glass body 7 shown in FIG. 6 is an optical micrometer known per se, and is adapted to be tilted within narrow limits about an axis lying in the plane of the drawing by means of a micrometer screw, so that the entire horizontal reading image can be displaced as a whole, i.e. the two relatively displaced image-parts can be displaced together. In FIG. 6, a double index is provided on the microscope graticule plate 10. The purpose of the flat prism 9 close to the microscope graticule plate 10 is to render visible in the microscope above the prism edge only the image formed by the half-beam passing through the fixed half-lens, while on the contrary, below the prism edge, only the image formed by the beam part passing through the movable half-lens 4. This also applies to the aperture diaphragm 13 in front of the microscope eyepiece.

In FIG. 6, the components 2, 5, 6, 8, 11, 12, 13 and 14 are known optical elements of the reading devices assumed as example.

By appropriate dimensioning of the mechanical elements of the control device indicated in FIG. 9, it is possible to ensure that the maximum relative displacement of the horizontal half-images in the reading microscope is equal to the distance between two adjacent graduation lines, for example in FIG. 3, that of the graduation lines 74 and 75. In addition to the dimensioning, the exact fulfilment of this requirement is ensured by making the degree of half-image displacement adjustable. For this purpose, the eccentricity EK of the eccentric is made variable by mounting the eccentric on a strip which can slide in the grooves 21 of the horizontal circle holder 16. After adjustment, this strip can then be fixed by means of known constructional elements.

For automatic displacement of the movable half-lens 4 in accordance with the aforesaid requirements, any other movement transmitting member may also be used.

The basic constructional solution given in the foregoing gives the co-ordinate difference $\delta y_1$. The co-ordinate difference $\delta x_1$ can be obtained by means of the same construction if the horizontal circle is rotated beforehand on the repetition axis through 90°. In this case, of course, the movable half-lens 4 will be displaced by the amount $b \sin (90°+\alpha_1)$ corresponding to the lateral angle $(90°+\alpha_1)$. Thus, the staff interval cut off by the two sightings will give directly the co-ordinate difference $\delta x_1$.

The two co-ordinate differences may be positive or negative. In the solution shown, the positive or negative sign of the values $\delta y_1$ and $\delta x_1$ will be given according to whether the cut-off staff interval, with the use of telescope position I, appears on the right or left of the staff zero mark. It is advantageous to use a special co-ordinate staff with two scales (FIG. 10), on which the scale situated to the right or left of the zero mark to be positioned over the measuring point, is coloured black or red. The scale interval is $$I = \frac{100}{\cot \epsilon} \text{ (cm.)}$$

or $$I = \frac{100}{\cot 1°} \text{ (cm.)} = 1.7455 \text{ cm.}$$

if $\epsilon = 1°$.

Measurements may also be made with the instrument in telescope position II. In this case, the signs of the two co-ordinate differences obtained will be opposite the real signs. The signs obtained in measurements in telescope position II must therefore be taken into consideration and noted altered.

For the co-ordinate theodolite, it is also possible to use a co-ordinate staff with one scale (FIG. 11). This staff however should be set up so that the zero mark at the end of the staff is over the point $P_1$. When measuring with such a co-ordinate staff, the positive co-ordinate differences $\delta y_1$ and $\delta x_1$ should be measured in telescope position I and the negative ones in telescope position II. The advantage of this method of measurement is that co-ordinate differences twice as large can be with a staff of the same length.

The construction described in the foregoing fully realises the constructional principles of the simple co-ordinate theodolite according to the invention.

Individual constructional forms of the constructional principle may differ from the constructional form set forth in the foregoing. Thus, for example, instead of the half lens 4 it is possible to use a plane glass wedge pair, the two wedges whereof are rotated automatically, but in opposite directions, through an angle agreeing with the angle of rotation of the alidade, the rotation of the wedges being controlled by the relative rotation of the alidade and horizontal circle using a known movement transmission member.

What I claim is:

1. Co-ordinate theodolite for direct measurement of horizontal orthogonal co-ordinates of points comprising a horizontal transparent circle having a single circular graduated scale thereon, two identical rows of numbers, one row of numbers arranged at the inner portion of said graduated scale and the other row of numbers arranged at the outer portion of said graduated scale, an optical reading system comprising an optical device and microscope graticule plate, said optical device disposed between said horizontal circle and said graticule plate, said optical device including a split lens, one part of said split lens stationarily mounted on said theodolite, the other part of said split lens movably mounted on said theodolite, said optical device transmitting the reading of said horizontal transparent circle onto said graticule plate in the form of a double image, mechanical means operatively connected to said optical device to shift the images of said double image relative to each other which is proportional to the sine function of the movement of the mechanical means, adjustment means connected to a further optical member of said optical reading system to simultaneously shift said two shifted images, and means having a diaphragm arranged adjacent said graticule plate to provide separation of said two images on the graticule plate.

2. Co-ordinate theodolite according to claim 1 in which said further optical member comprises a plane-parallel glass body, and said adjustment means connected to said plane-parallel glass body comprises a micrometer screw to tilt said plane-parallel glass body about an axis parallel to the axis of said optical device.

3. Co-ordinate theodolite according to claim 1 in which said mechanical means comprises a holder for said horizontal circle, an eccentric having an opening therein movably mounted on a strip arranged in grooves in said holder, a movable frame slide having an aperture therein mounted in further grooves in said holder adjacent said eccentric and horizontal circle, said eccentric having a diameter equal to the width of said aperture and mounted within said aperture, said optical device having a part mounted on said movable frame slide adjacent said horizontal circle, and an alidade mounted within said opening of said eccentric, the rotation of said alidade moves said frame slide and said part of said optical device mounted on said movable frame slide relative to said horizontal circle.

4. Co-ordinate theodolite for direct measurement of horizontal orthogonal co-ordinates of points, comprising a horizontal transparent circle having a single circular graduated scale thereon, two identical rows of numbers, one row of numbers arranged at the inner portion of said graduated scale and the other row of numbers arranged at the outer portion of said graduated scale, an optical reading system comprising an optical device and microscope graticule, said optical device disposed between said horizontal circle and said graticule, said optical device consisting of a split lens, one part of said split lens stationarily mounted on said theodolite, the other part of said split lens movable by a mechanical means mounted on said theodolite, said optical system transmitting the reading of the horizontal circle onto the microscope graticule in the form of a double image, said mechanical means operatively connected to said optical device to shift said images relative to each other proportionally to the sine function of the rotation of the mechanical means, a plane-parallel plate movable by a micrometer screw mounted on said optical reading system so that said images can be shifted simultaneously, further optical means for separating the shifted images comprising a double glass plate prism mounted at the side of the microscope graticule, and a rectangular diaphragm disposed in the microscope.

5. Co-ordinate theodolite according to claim 4, in which the movable part of said optical device between the horizontal circle and the graticule is rotatable in an opposite sense about an axis parallel with the optical axis thereof.

6. Co-ordinate theodolite according to claim 4, in which the movable part of said split lens is fastened to a frame slide moving at right angles to the vertical axis of said theodolite and parallel to the limiting surface of said split lens, said frame being shifted by means of an eccentric fixed to the horizontal circle and extending into a groove of the frame when the mechanical means is rotated about the vertical axis.

References Cited in the file of this patent

UNITED STATES PATENTS

| | | |
|---|---|---|
| 1,503,758 | Konig | Aug. 5, 1924 |
| 2,579,067 | Cunningham | Dec. 18, 1951 |
| 2,757,567 | Hillman et al. | Aug. 7, 1956 |